United States Patent [19]
Aoki et al.

[11] 4,304,881
[45] Dec. 8, 1981

[54] ALKENYL AROMATIC RESIN COMPOSITION HAVING AN EXCELLENT IMPACT STRENGTH

[75] Inventors: Akira Aoki, Kawasaki; Toshinori Shiraki, Yokohama; Toshio Ibaragi, Kawasaki, all of Japan

[73] Assignee: Asahi Kasei Kogyo Kabushiki Kaisha, Osaka, Japan

[21] Appl. No.: 98,555

[22] Filed: Nov. 29, 1979

[30] Foreign Application Priority Data

Dec. 4, 1978 [JP] Japan .................. 53-148999

[51] Int. Cl.$^3$ ............... C08L 53/02; C08L 51/04
[52] U.S. Cl. ........................ 525/66; 525/67; 525/68; 525/71; 525/92; 525/99; 525/314; 260/42.18; 260/42.47
[58] Field of Search .............. 525/71, 99, 92, 64, 525/66–68, 89, 314; 260/42.18

[56] References Cited
U.S. PATENT DOCUMENTS

| | | | |
|---|---|---|---|
| 3,833,687 | 9/1974 | Lee | 525/71 |
| 3,835,200 | 9/1974 | Lee | 525/68 |
| 3,907,930 | 9/1975 | O'Grady | 525/71 |
| 4,075,285 | 2/1978 | Tabana et al. 525 | 71/ |
| 4,080,403 | 3/1978 | Gergen et al. | 525/92 |
| 4,166,055 | 8/1979 | Lee | 260/30.6 R |

Primary Examiner—Carman J. Seccuro
Attorney, Agent, or Firm—Birch, Stewart, Kolasch & Birch

[57] ABSTRACT

An alkenyl aromatic resin composition having an excellent impact strength, which comprises (I) 100 parts by weight of a rubber-modified alkenyl aromatic resin containing from 2 to 35 wt. % of conjugated diolefin components, or a resinous mixture containing at least a component of the resin thereof; and (II) 1 to 50 parts by weight of a random segment copolymer containing at least a Segment A which is a random copolymer of a conjugated diolefin and a vinyl-substituted aromatic compound with a weight ratio being ranging from 30:70 to 5:95 and at least a Segment B, which is a conjugated diolefin polymer or a random copolymer of a conjugated diolefin and a vinyl-substituted aromatic compound with a weight ratio being ranging from 100:0 to 75:25, the random segment copolymer being characterized by containing;

(a) at least 10 wt. % of Segment A based on the total random segment copolymer,
(b) at least 20 wt. % of Segment B based on the total random segment copolymer, and
(c) at least 60 wt. % of a sum of Segment A and Segment B based on the total random segment copolymer.

The resin composition of the present invention can be used to make a variety of useful products, such as film, foam, injection moldings and compression moldings.

8 Claims, 1 Drawing Figure

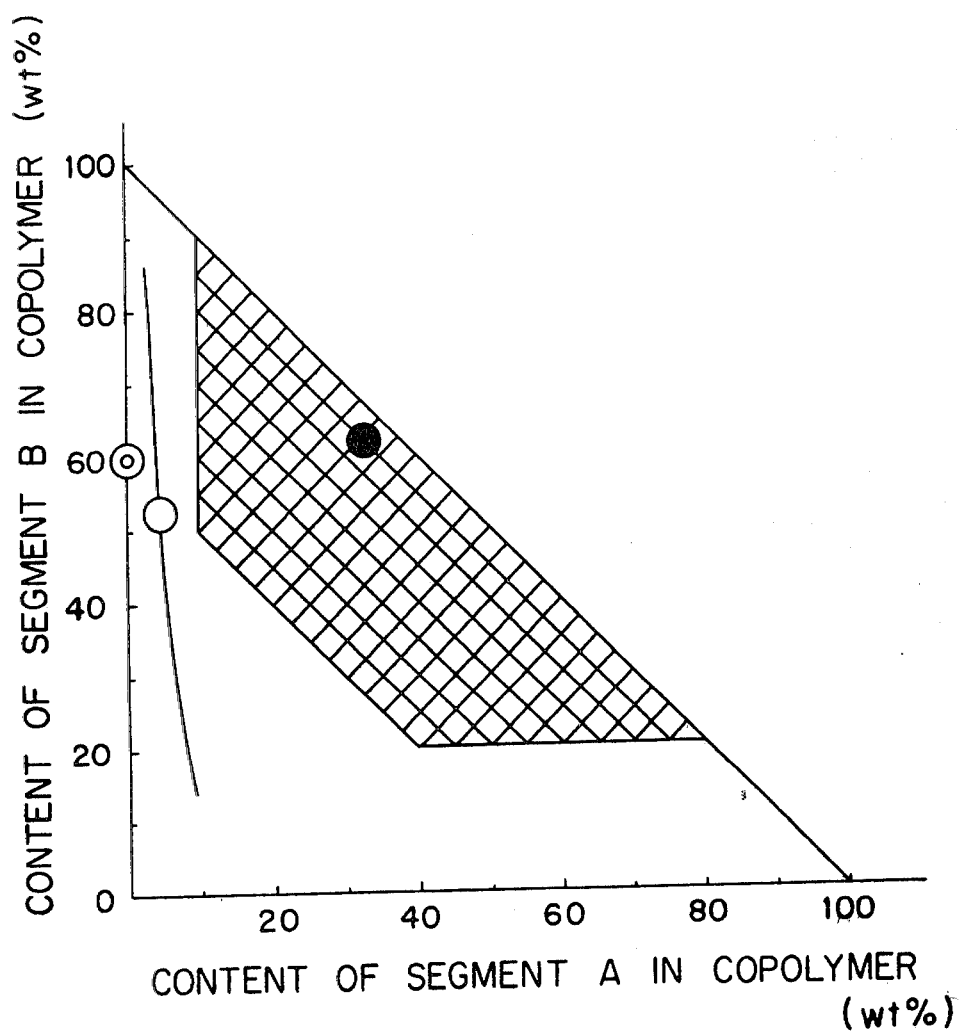

ALKENYL AROMATIC RESIN COMPOSITION HAVING AN EXCELLENT IMPACT STRENGTH

BACKGROUND OF THE INVENTION

The present invention relates to a alkenyl aromatic resin composition having an excellent impact strength. More particularly, it relates to a alkenyl aromatic resin composition prepared by blending a random segmented copolymer with a rubber-modified alkenyl aromatic resin or a resinous mixture containing the resin thereof.

Rubber-modified alkenyl aromatic resins containing from 2 to 35 wt. % of conjugated diolefin components or resinous mixtures containing at least one of these components, which are exemplified by rubber-modified polystyrene, acrylonitrile-butadiene-styrene copolymer, methylmethacrylate-butadiene-styrene copolymer, and polyphenylene ether resin containing rubber-modified polystyrene, have so far been commercially available.

These rubber-modified alkenyl aromatic resins have been used as various products such as packaging materials, electrical parts, automobile parts, and architectural decorations, taking full advantage of their rigidity, high impact strength and processability.

Conventionally, manufacturers had selected one or more of these commercially available rubber-modified alkenyl aromatic resins, while taking account of costs and physical properties, and had used them alone or in the form of blends, to manufacture those products which could meet the demands from end users. However, there have been frequent occasions in which commercially available rubber-modified alkenyl aromatic resins had such insufficient impact strength that manufacturers often could not produce those high-impact resistant products which might satisfy their end users. Therefore, there has been great expectations for the development of blending technology that can improve the impact strength of commercially available rubber-modified alkenyl aromatic resins without adversely affecting other physical properties.

As one of the methods of improving impact strength of rubber-modified alkenyl aromatic resins, it has already been known to use a block copolymer of a vinyl-substituted aromatic compound and a conjugated diolefin as a toughening agent for alkenyl aromatic resins. British Pat. No. 1,077,769 and Japanese Preliminary Publication of Patent No. 56250/1973, for example, describe the use of a block copolymer of the ideal type which consists of a vinyl-substituted aromatic polymer block and a conjugated diolefin polymer block. Japanese Preliminary Publication of Patent No. 108455/1977 describes a radial teleblock copolymer of the ideal type to be used as a toughening agent for a polyphenylene ether resin composition consisting of a polyphenylene ether resin and a rubber-modified polystyrene.

However, these resin compositions consisting of a block copolymer and a rubber-modified alkenyl aromatic resin, described in the above references, do not exhibit full effect in improving the impact strength unless the compositions contain a relatively large amount of the block copolymer. Unfortunately, the addition of a large amount of block copolymer to a rubber-modified alkenyl aromatic resin composition brings about a practically unfavorable result, because mechanical properties such as rigidity and tensile strength will decrease.

In view of the present circumstances, the inventors have studied intensely to develop a highly efficient toughening agent used for a rubber-modified alkenyl aromatic resin or a resinous mixture containing the resin thereof. It has been discovered from these studies that, when a specific random segmented copolymer is added to a rubber-modified alkenyl aromatic resin or a resinous mixture containing the resin thereof, the obtained resin composition exhibits greatly improved impact strength, without adversely affecting any other mechanical properties. Such a discovery has led the inventors to complete the present invention.

SUMMARY OF THE INVENTION

Accordingly, the present invention provides an alkenyl aromatic resin composition having an excellent impact strength, which comprises (I) 100 parts by weight of a rubber-modified alkenyl aromatic resin containing from 2 to 35 wt. % of conjugated diolefin components, or a resinous mixture containing at least a component of the resin thereof; and (II) 1 to 50 parts by weight of a random segmented copolymer containing at least a Segment A, which is a random copolymer segment of a conjugated diolefin and a vinyl-substituted aromatic compound with a weight ratio ranging from 30:70 to 5:95, respectively, and at least a Segment B, which is either a conjugated diolefin polymer segment or a random copolymer segment of a conjugated diolefin and a vinyl-substituted aromatic compound with a weight ratio ranging from 100:0 to 75:25, the random segmented copolymer being characterized by containing;

(a) at least 10 wt. % of Segment A based on the total random segmented copolymer,
(b) at least 20 wt. % of Segment B based on the total random segmented copolymer, and
(c) the sum of Segment A and Segment B being at least 60 wt. % based on the total random segmented copolymer.

BRIEF DESCRIPTION OF THE DRAWING

FIGURE illustrates a relationship between the claimed area for the random segmented copolymer of the present invention on one hand and the ideal type block copolymer and the taper type block copolymer in prior art on the other hand, wherein the marks used in the FIGURE have the following meaning:

| | |
|---|---|
| ▦ | Claimed area for the random segmented copolymer of the present invention; |
| ——— | A relation of segment A content to segment B content in the taper type block copolymer obtained by polymerizing a mixture of butadiene and styrene in the presence of an organolithium catalyst; |
| ● | Sample of Example 1 in the specification of the present invention; |
| ◎ | Sample of Comparative Example 1 in the specification of the present invention; |
| ○ | Sample of Comparative Example 2 in the specification of the present invention; |
| Segment A: | Random copolymer segment, in which conjugated diolefin and vinyl-substituted aromatic compound are in the weight ratio ranging from 30:70 to 5:95; and |
| Segment B: | Conjugated diolefin polymer segment or random copolymer segment, in which conjugated diolefin and vinyl-substituted aromatic compound are in the weight ratio ranging from 100:0 to 75:25. |

DETAILED DESCRIPTION OF THE INVENTION

The random segmented copolymer used according to the present invention has less mechanical strength like tensile strength, than conventional block copolymers of the ideal type or the taper type. Yet the alkenyl aromatic resin composition consisting of the rubber-modified alkenyl aromatic resin or the resinous mixture containing the resin thereof and the random segmented copolymer according to the present invention exhibits quite an improved impact strength, as compared with the resin compositions containing conventional block copolymers of the ideal type or the taper type. This has been an unexpected observation by the inventors.

The random segmented copolymer used according to the present invention contains at least one Segment A which is a random copolymer of a conjugated diolefin and a vinyl-substituted aromatic compound with a weight ratio ranging from 30:70 to 5:95, respectively, and at least one Segment B, which is a conjugated diolefin polymer or a random copolymer of the conjugated diolefin and the vinyl-substituted aromatic compound with a weight ratio being ranging from 100:0 to 75:25. Its structures can be illustrated by the following general formulas:

$(A-B)_{\overline{n}}A, (A-B)_l, B-(A-B)_l, (B-A-C)_l$ $(A-B)_{\overline{n}}C, C-B-(A-B)_l, (C-A-B)_l-A-C,$

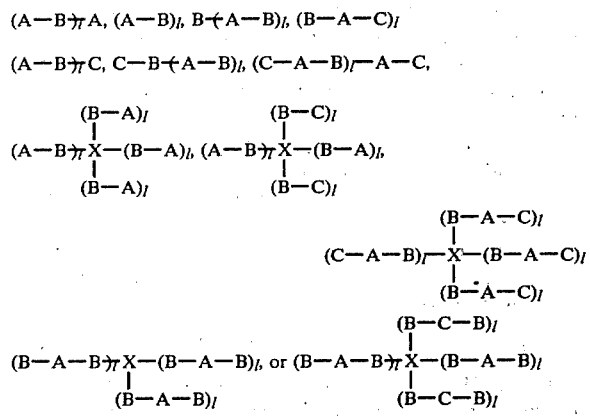

wherein A and B represent Segment A and Segment B respectively, and Segment C represents a segment of polymer of a vinyl-substituted aromatic compound; l is an integer of from 1 to 5; and X represents a residue of such coupling agents as, e.g., silicon tetrachloride and carbon tetrachloride.

Needless to say, the structure of the random segmented copolymer used according to the present invention is not limited to the above formulas. Any random segmented copolymer can be used as long as it contains at least one Segment A and at least one Segment B. Segment A has a content of vinyl-substituted aromatic compound in the range of from 70 to 95 wt. %, whereas Segment B has a corresponding content ranging from 0 to 25 wt. %. It is undesirable that the content of vinyl-substituted aromatic compound in Segment A and Segment B goes out of these ranges, because outside these ranges, the random segmented copolymer is less effective in improving the impact strength of the moldings thereof.

The vinyl-substituted aromatic compound in Segment A and Segment B of the random segmented copolymer used according to the present invention may be distributed uniformly or in a taper along the polymer chain.

The random segmented copolymer according to the present invention contains at least 10 wt. %, preferably at least 15 wt. %, of Segment A component and at least 20 wt. %, preferably at least 40 wt. %, of Segment B content based on the total weight of the random segmented copolymer. Moreover, a sum of Segment A and Segment B has a content of 60 wt. % or more based on the aforementioned random segmented copolymer. It is undesirable that the contents of Segment A and Segment B are out of these ranges, because out of these ranges, the random segmented copolymer would tend to be less effective in improving impact strength.

The total content of bound vinyl-substituted aromatic compound of the random segmented copolymer according to the present invention is, preferably, in the range of from 30 to 65 wt. %, more preferably from 30 to 50 wt. %. If the total content of bound vinyl-substituted aromatic compound is less than 30 wt. %, or more than 65 wt. %, the effect of improving the impact strength will tend to become low.

The molecular weight of the random segmented copolymer according to the present invention is in the range of from 10,000 to 1,000,000, preferably 30,000 to 800,000, the range of which is similar to that of ordinarily used block copolymers.

Unlike the processes for producing conventionally known common block copolymers of the ideal type or the taper type, the process for producing the random segmented copolymer according to the present invention requires some measures concerning randomization. When a conjugated diolefin is copolymerized with a vinyl-substituted aromatic compound, using, e.g., an organolithium compound as the catalyst, the conjugated diolefin preferentially first polymerizes, because the two monomers have different copolymeric reaction rates. Therefore, the vinyl-substituted aromatic compound substantially starts polymerization after most of the conjugated diolefin has been consumed, thus resulting in a so-called taper type block copolymer. Such a polymerization method would not provide a copolymer in which the content of Segment A and/or the content of Segment B in the random segment copolymer is in the copolymer range specified according to the present invention.

As the processes for random copolymerization of conjugated diolefins and vinyl-substituted aromatics, there have been conventionally proposed the following processes:

(1) Processes using as a randomizer, polar compounds, alcoholates of alkali metal, or alkali earth metal, which do not deactivate organolithium compounds (U.S. Pat. Nos. 3,251,905 and 3,331,821).

(2) Processes in which randomization is carried out by the control during polymerization (British Pat. Nos. 903,331 and 1,283,327).

Although the well known randomization processes described above can be applied to obtain the random segmented copolymers according to the present invention, randomization processes are not limited to those described above. Any process of randomization can be applied as long as the conjugated diolefin is randomly copolymerized with the vinyl-substituted aromatic compound.

The contents of Segment A and Segment B in the random segment copolymer according to the present invention can be determined by periodically sampling the polymer solution during the copolymerization and measuring the conversion of monomers and the amount of vinyl-substituted aromatic compound in the polymer thus obtained.

The vinyl-substituted aromatic compounds according to the present invention are exemplified by styrene, o-methylstyrene, p-methylstyrene, m-methylstyrene, α-methylstyrene, p-ethylstyrene, 2,4-dimethylstyrene, vinylnaphthalene, vinylanthracene, etc. Among them, sytrene is most common. These compounds can be used alone or as a mixture of two or more compounds.

The conjugated diolefin according to the present invention is a diolefin of 4 to 12 carbon atoms having a pair of conjugated double bonds. Examples of such a conjugated diolefin are 1,3-butadiene, isoprene, 1,3-pentadiene, 2,3-dimethyl-1,3-butadiene, 3-methyl-1,3-octadiene, 1-phenyl-1,3-butadiene, 1,3-hexadiene, 1,3-octadiene, 4-thyl-1,3-hexadiene, etc. 1,3-Butadiene and isoprene are particularly preferred. These diolefins can be used alone or as a mixture of two or more diolefins.

The random segmented copolymer according to the present invention is blended in an amount of from 1 to 50 parts by weight per 100 parts by weight of the rubber-modified alkenyl aromatic resin or the resinous mixture containing the resin thereof. Employment of less than 1 or higher than 50 parts by weight of the random segmented copolymer is not desirable, because below 1 part by weight of the random segmented copolymer, the resin composition would not be effective enough to improve the impact strength, and when a filler is to be blended, it would be hardly effective in promoting distribution thereof; above 50 parts by weight of the random segmented copolymer, the rigidity of the composition would become lower.

The rubber-modified alkenyl aromatic resin used according to the present invention may be any alkenyl aromatic resin containing from 2 to 35 wt. % of conjugated diolefin components. The examples of such a resin may be rubber-modified polystyrene, acrylonitrile-butadiene-styrene copolymer (ABS), methylmethacrylate-butadiene-styrene copolymer (MBS), and a block copolymer resin of styrene and conjugated diolefin having a bound styrene content of 65-98%. Further, as a resinous mixture containing at least one of the rubber-modified alkenyl aromatic resins according to the present invention, there may be mentioned the mixtures of the afore-mentioned rubber-modified alkenyl aromatic resin and a thermoplastic resin, such as, e.g., polyphenylene ether resin, polystyrene, polyethylene, polypropylene, polyvinyl chloride, nylon, polyacetal, polycarbonate, polysulfon, and polyester. The rubber-modified alkenyl aromatic resin is present in such a resinous mixture in an amount of 10 wt. % or more, preferably 20 wt. % or more. When the rubber-modified alkenyl aromatic resin in the mixture is less than 10 wt. %, it would be of no use to mix this resin with the thermoplastic resin. Furthermore, the random segmented copolymer, when blended, would be less effective in improving the impact strength of the composition.

The rubber-modified alkenyl aromatic resin according to the present invention is an alkenyl aromatic resin containing 2-35 wt. % of conjugated diolefin. Those containing more than 35 wt. % or less than 2 wt. % of conjugated diolefin are not desirable, because above 35 wt. %, the composition would be less rigid; below 2 wt. %, the impact strength of the composition would become lower.

The alkenyl aromatic resin composition of the present invention may contain any additive, if necessary. When an additive is to be blended with the composition of the present invention, it is blended preferably in an amount of 50 parts by weight or less per 100 parts by weight of alkenyl aromatic resin composition. When an additive is in excess of 50 parts by weight, the alkenyl aromatic resin composition of the present invention tends to exhibit inferior mechanical properties including impact strength and tensile strength. There is no particular restriction to the type of additives as long as they are usually used for blending with plastics. Representative examples of the additive may be flame retardant; glass fiber; glass beads; organic fibers; pigments such as titanium white, carbon black, and iron oxide; dyestuffs; inorganic reinforcing agents, such as silica, calcium carbonate, and talc; organic reinforcing agents such as coumaroneindene resin; metal powder; woodmeal; other extenders; and mixtures thereof. These additives can be selected suitably depending upon the uses of the resin composition according to the present invention. In addition, there can be used suitable amounts of other additives, if necessary, which have been conventionally utilized for blending with plastics, such additives are, for example, anti-oxidant, heat stabilizer, antistatic agent, UV light absorber, lubricant, and plasticizer.

The alkenyl aromatic resin composition having high impact strength according to the present invention may be obtained by blending a random segmented copolymer with a rubber-modified alkenyl aromatic resin or with a resinous mixture containing the resin thereof, and if required, also by blending additives, using any of conventionally well known blending techniques.

One of such techniques makes use of mechanical mixing by means of roll mill, Banbury mixer, and extruder, etc.; in another technique, a blend is dissolved or dispersed in a solvent, which is evaporated to provide a resin composition. The resin composition thus obtained according to the present invention can be easily processed into moldings of various shapes by any conventional well known molding methods such as, e.g., injection molding and extrusion molding. These moldings obtained have excellent impact strength as compared with the moldings of resin compositions using conventional block copolymers of the ideal type or the taper type.

The alkenyl aromatic resin composition of the present invention can be used to make a wide variety of useful products, exemplified by film, foam, sheets, injection moldings, and compression moldings, etc. Accordingly, the present invention can be said to have quite high industrial significance.

The present invention will be more fully described by the following examples. It is to be understood that these examples are illustrative of the present invention and are not construed as limiting the scope thereof. All the percent and parts are weight percent and parts by weight, respectively, unless otherwise noted.

EXAMPLE 1 AND COMPARATIVE EXAMPLES 1, 2 AND 3

A jacketed 1-liter autoclave equipped with a stirrer was washed, dried, and flushed with nitrogen. To the autoclave kept at 70° C., there were charged 2.9 g of styrene which has previously been purified and dried, 11.4 g of butadiene, and 57.2 g of cyclohexane. A solution of butyllithium in hexane in an amount of 0.100 g in terms of butyllithium and nonylphenoxypotassium in a molar amount of 0.25 times as much as butyllithium were then added to initiate the polymerization reaction. One hour after the catalyst has been added, a mixture of 17.1 g of prepurified styrene, 1.9 g of butadiene, and 76.0 g of cyclohexane was added. The temperature was lowered to 50° C., and the polymerization reaction was continued. After one more hour's reaction, a mixture of 2.9 g of dry purified styrene, 44.8 g of butadiene, and 190.8 g of cyclohexane was added. The temperature was raised to 70° C., and the mixture was reacted for 1 hour. Further, another mixture of 17.1 g of dry purified styrene, 1.9 g of butadiene, and 76.0 g of cyclohexane was then added. The temperature was brought back to 50° C., and the polymerization was continued for 1 hour. When such polymerization reaction was finished, butylated hydroxytoluene (BHT) was added as a stabilizer to the copolymer solution thus obtained. The copolymer was precipitated from the solution by using excess methanol, and the precipitate was dried under reduced pressure [Example-1 sample].

For the purpose of comparison, an ideal type block copolymer was synthesized by a method of stepwise addition of monomers, as described below. To the same autoclave as used in Example 1, there were charged 13.3 g of dry purified butadiene, and 53.2 g of cyclohexane. A solution of butyllithium in hexane was added in and amount of 0.100 g in terms of butyllithium, and the mixture was polymerized for 1 hour, while maintaining the temperature at 70° C. Then, 20 g of dry purified styrene and 80 g of cyclohexane were added, and polymerization was continued for 1 hour, while maintaining the temperature at 50° C. Thereafter, 46.7 g of dry purified butadiene and 186.8 g of cyclohexane were added, and polymerization was continued at 70° C. for 1 hour. Finally 20 g of dry purified styrene and 80 g of cyclohexane were added, and polymerization was continued at 50° C. for 1 hour. The copolymer solution thus obtained was treated in a similar manner as described above to obtain an ideal type block copolymer [Comparative Example-1 sample].

Again for the purpose of comparison, a taper type block copolymer was synthesized by a method described below. To the same autoclave as used in Example 1, there were charged 20 g of dry purified styrene, 13.3 g of butadiene, and 133.2 g of cyclohexane. A solution of butyllithium in hexane was added in an amount of 0.100 g in terms of butyllithium, and the mixture was polymerized at 70° C. for 1 hour. A mixture of 20 g of dry purified styrene, 46.7 g of butadiene, and 266.8 g of cyclohexane was then added, and polymerization was continued for 1 hour, while maintaining the temperature at 70° C. The copolymer solution thus obtained was treated in a similar manner as described above to obtain a taper type block copolymer [Comparative-Example-2 sample].

Still for the purpose of comparison, a random copolymer was synthesized by a method described below. To the same 1-liter autoclave as used in Example 1, there were charged 40 g of dry pre-purified styrene, 60 g of butadiene, and 400 g of cyclohexane. The temperature inside the autoclave was raised to 60° C., and a solution of butyllithium in hexane in an amount of 0.100 g in terms of butyllithium and nonylphenoxypotassium in a molar amount of 0.25 times as large as butyllithium were added to initiate the polymerization reaction. The polymerization was continued for 2 hours, while maintaining the temperature at 60° C. The copolymer solution thus obtained was treated in a similar manner as described above to obtain a random copolymer [Comparative-Example-3 sample]. These samples were analyzed to give the following results:

TABLE 1

| Samples | Bound styrene content, % | Block styrene content, % | MI(G) g/10 min. | Hardness (JIS) | Tensile strength* kg/cm² |
|---|---|---|---|---|---|
| Example 1 | 39.5 | 5.1 | 4.2 | 63 | 52 |
| Comparative Example 1 | 39.0 | 39.0 | 10.3 | 85 | 230 |
| Comparative Example 2 | 39.7 | 31.8 | 9.5 | 80 | 125 |
| Comparative Example 3 | 39.6 | 2.1 | 1.5 | 38 | 18 |

*Conforming to JIS K-6301.

20 parts of each of these samples were then respectively blended with 100 parts of commercially available rubber-modified polystyrene (Stylon 470, Asahi Dow), and each of the blends was molten and mixed at a mixing temperature of 170°-180° C. for 10 min. in a Banbury mixer. The blended composition was taken out of the mixer and passed through a grinder and an extruder to form pellets. These pellets were compression-molded into test pieces, which were tested for Izod impact strength, as measured in accordance with JIS K-6871. The test results for all samples are as given in Table 2, below. The test exhibited that, as compared with the conventional resin composition containing block copolymers of the ideal type, or of the taper type, or random copolymer, the resin composition containing a random segment copolymer according to the present invention has sharply increased the impact strength of resultant moldings, without impairing other kinds of mechanical strength.

TABLE 2

| Samples | Tensile strength at yield kg/cm² | Elongation at break, % | Maximum bending stress kg/cm² | Izod impact strength (notched) kg-cm/cm |
|---|---|---|---|---|
| Example 1 | 135 | 42 | 280 | 17.6 |
| Comparative Example 1 | 134 | 44 | 286 | 14.2 |
| Comparative Example 2 | 135 | 42 | 284 | 14.7 |
| Comparative Example 3 | 117 | 56 | 265 | 9.8 |
| Rubber-modified polystyrene (Stylon 470) | 200 | 28 | 364 | 6.2 |

EXAMPLES 2 AND 3, COMPARATIVE EXAMPLES 4 TO 6

The same 1-liter autoclave as used in Example 1 was maintained at 90° C., and thereinto were charged 200 g of cyclohexane and a solution of butyllithium in hexane in an amount of 0.100 g in terms of butyllithium. A liquid mixture of 20 g of styrene, 5 g of butadiene, and 50 g of cyclohexane (for use in polymerization of Segment A) was pumped into the autoclave at a rate of 3 ml/min. When pumping was finished, the mixture was left to stand for about 5 min. with stirring. A liquid mixture of 50 g of butadiene and 100 g of cyclohexane (for use in polymerization of Segment B) was then charged at a rate of 3 ml/min., and when charging was finished, the mixture was left to stand for about 5 min. Thereafter, another liquid mixture of 20 g of styrene, 5 g of butadiene, and 50 g of cyclohexane (for use in polymerization of Segment A) was again charged at a rate of 3 ml/min., and when charging was finished, the mixture was left to stand for about 30 min. The reaction temperature was maintained at 90° during polymerization. The copolymer solution thus obtained was treated as described above to obtain a random segmented copolymer of the A-B-A type [Example-2 sample]. The content of block styrene in the random segmented copolymer was 20.3%.

In a manner similar to Example 2, there were prepared those samples having different amounts of styrene fed for Segment A and Segment B [Example-3 sample and Comparative-Example-4, -5, and -6 samples, respectively].

TABLE 3

| Samples | Feed styrene content in segments, % | | Bound styrene content in copolymers, % | MI(G) g/10 min. |
|---|---|---|---|---|
| | Segment A | Segment B | | |
| Example 2 | 80 | 0 | 40.0 | 4.3 |
| Example 3 | 80 | 20 | 39.5 | 3.7 |
| Comparative Example 4 | 100 | 0 | 39.7 | 7.3 |
| Comparative Example 5 | 60 | 0 | 39.1 | 1.2 |
| Comparative Example 6 | 80 | 32 | 40.2 | 2.3 |

20 parts of each of these samples and 5 parts of titanium white were then respectively blended with 100 parts of commercially available rubber-modified polystyrene (Stylon 492, Asahi Dow). Each of the blends was kneaded, molded, and tested for Izod impact strength, in a similar manner to Example 1. The test exhibited that, as compared with the resin compositions containing those random segmented copolymers in which bound styrene content of segments is out of the ranges specified according to the present invention, the resin composition containing the random segmented copolymers according to the present invention has greatly improved the impact strength. The injection moldings of the resin compositions in Comparative Examples 5 and 6 were less glossy than other resin compositions tested.

TABLE 4

| Samples | Izod impact strength (notched kg . cm/cm |
|---|---|
| Example 2 | 17.9 |
| Example 3 | 17.1 |
| Comparative Example 4 | 13.2 |
| Comparative Example 5 | 12.8 |
| Comparative Example 6 | 9.1 |
| Copolymer not added | 5.8 |

EXAMPLES 4 AND 5, COMPARATIVE EXAMPLES 7 AND 8

The same 1-liter autoclave as used in Example 1 was maintained at 90° C., and thereinto were charged 200 g of cyclohexane and a solution of butyllithium in hexane in an amount of 0.270 g in terms of butyllithium. A liquid mixture of 35 g of styrene, 10 g of butadiene, and 100 g of cyclohexane (for use in polymerization of Segment A) was pumped into the autoclave at a rate of 3 ml/min. When the charging was finished, the mixture was left to stand for about 5 min. A liquid mixture of 50 g of butadiene and 100 g of cyclohexane (for use in polymerization of Segment B) was then charged at the same rate as is done in the Segment A. When charging was finished, the mixture was left to stand for about 30 min. Silicon tetrachloride was then added in an amount of ¼ equivalent based on the amount of butyllithium added, to proceed with the coupling reaction. A random segmented copolymer of the (A-B)$_4$-Si type was thus obtained [Example-4 sample].

In a similar manner to Example 4, there were prepared those samples which commonly have a feed styrene content of 77.8% in Segment A, but in which copolymers have a bound styrene content of 49%, 20%, and 70% [Example-5 sample, Comparative-Example-7 and -8 samples].

TABLE 5

| Samples | Bound styrene content of copolymers, % | MI(G) g/10 min. |
|---|---|---|
| Example 4 | 35.7 | 3.3 |
| Example 5 | 49.0 | 4.3 |
| Comparative Example 7 | 20.8 | 0.9 |
| Comparative Example 8 | 70.3 | 7.9 |

These samples were respectively blended with 100 parts of commercially available rubber-modified polystyrene (Stylon 470, Asahi Dow) in such a way that the resin compositions may have an additionally added polybutadiene content of 7%. Each of the blends was kneaded at 210° C., using a twin-screw extruder, and was cut into pellets by a cutter. These pellets were compression-molded into test pieces, which were tested for Izod impact strength. Results are as given in Table 6. As obvious from the table, the resin compositions containing random segmented copolymers according to the present invention has quite higher impact strength than the resin compositions containing those random segment copolymers in which bound styrene content is out of the ranges specified according to the present invention.

TABLE 6

| Samples | Bound styrene content of polymers, % | Amounts of copolymer added, part* | Izod impact strength (notched) kg . cm/cm |
|---|---|---|---|
| Example 4 | 35.7 | 12.1 | 12.2 |
| Example 5 | 49.0 | 15.9 | 11.1 |
| Comparative Example 7 | 20.8 | 9.7 | 7.5 |
| Comparative Example 8 | 70.3 | 30.8 | 7.1 |

Footnotes for Table 6:
*Based on 100 parts of the resin composition.

EXAMPLES 6, 7 AND 8, COMPARATIVE EXAMPLES 9 AND 10

The random segmented copolymer of Example 3 (15, 30 and 40 parts, respectively) was blended with 100 parts of commercially available rubber-modified polystyrene (Stylon 475, Asahi Dow). Each of the blends was kneaded, molded, and tested for Izod impact strength and maximum bending stress in a similar manner to Example 1 [Examples 6, 7 and 8, respectively].

For the purpose of comparison, the rubber-modified polystyrene only, and a blend of 70 parts of the random segmented copolymer and 100 parts of the rubber-modified polystyrene were tested for the same physical properties, respectively [Comparative Examples 9 and 10]. The test exhibited that the resin composition containing 70 parts of the random segmented copolymer had a remarkably lower level of maximum bending stress than the resin compositions of the present invention, as shown in Table 7.

TABLE 7

| Samples | Amount of copolymer added, part | Izod impact strength (notched) kg . cm/cm | Maximum bending stress kg/cm² |
|---|---|---|---|
| Example 6 | 15 | 14.0 | 385 |
| Example 7 | 30 | 26.2 | 280 |
| Example 8 | 40 | 34.2 | 210 |
| Comparative Example 9 | 0 | 6.5 | 425 |
| Comparative Example 10 | 70 | No break | 40 |

EXAMPLE 9, COMPARATIVE EXAMPLES 11 AND 12

Commercially available rubber-modified polystyrene (Stylon 470, Asahi Dow, 100 parts), 5 parts of the random segmented copolymer obtained in Example 1, 3 parts of antimony trioxide, and 30 parts of hexabromobenzene were blended. The blend was kneaded at a roll surface temperature of 150°–160° C. for 10 to 15 min., molded, and tested for Izod impact strength [Example 9].

For the purpose of comparison, there were prepared a composition similar to that in Example 9 except that 60 parts of hexabromobenzene was used, and a composition wherein the sample of Comparative Example 1 was substituted for the random segmented copolymer in Example 9. They were also tested for Izod impact strength [Comparative Examples 11 and 12].

The tests exhibited that with an increased amounts of additives, the composition lowered the Izod impact strength of the composition, and that a random segmented copolymer of the present invention was more effective in improving the impact strength of the blend composition than the ideal type block copolymer of Comparative Example 12 was.

TABLE 8

| Samples | Types of copolymer | Amounts of hexabromobenzene added, parts | Izod impact strength (notched) kg . cm/cm |
|---|---|---|---|
| Example 9 | Random segment copolymer (Ex. 1) | 30 | 5.8 |
| Comparative Example 11 | Random segment copolymer (Ex. 1) | 60 | 1.3 |
| Comparative Example 12 | Ideal type block copolymer (Comparative Ex. 1) | 30 | 4.2 |
| Rubber-modified polystyrene (Stylon 470) | — | 30 | 2.5 |

EXAMPLE 10, COMPARATIVE EXAMPLE 13

The same 1-liter autoclave as used in Example 1 was kept at 70° C., and thereinto were charged 6.7 g of dry prepurified styrene, 56.3 g of butadiene, and 324.5 g of cyclohexane. A solution of low molecular weight dilithiopolyisoprene catalyst in hexane in an amount of 3.1 mmole in terms of lithium and nonylphenoxypotassium in a molar amount of 0.25 times as much as lithium were added to initiate the polymerization reaction. One hour after the catalyst was added, there was added a mixture of 33.5 g of pre-purified styrene, 3.7 g of butadiene, and 176.5 g of cyclohexane. The reaction temperature was decreased to 50° C., and polymerization was continued for 1 hour. The copolymer solution thus obtained was treated in a similar manner to Example 1 to provide a random segmented copolymer of the A-B-A type [Example-10 sample].

For the purpose of comparison, a copolymer was prepared in which a random copolymer Segment A having a bound styrene content of 80 wt. % is present at 9 wt. % in the total random segmented copolymer. It was prepared as follows. To the same 1-liter autoclave as above were charged 3.0 g of dry pre-purified styrene, 58.2 g of butadiene, and 324.5 g of cyclohexane. The same amount of the same catalyst as in Example 10 was added to initiate the polymerization, while maintaining the temperature at 70° C. One hour after the catalyst was added, a mixture of 7.2 g of styrene, 1.8 g of butadiene and 45 g of cyclohexane was added, and polymerization was continued at 50° C. for 1 hour. Another mixture of 30.0 g of styrene and 131.5 g of cyclohexane was added, and polymerization was continued for 1 hour to obtain a copolymer [Comparative Example 13]. Analyses of these copolymers gave the following results:

TABLE 9

| Samples | Bound styrene content, % | Block styrene content, % | MI(G) g/10 min. |
|---|---|---|---|
| Example 10 | 40.0 | 5 | 3.5 |
| Comparative Example 13 | 39.8 | 30.3 | 7.3 |

20 parts of the above-mentioned copolymers were respectively blended with a resinous mixture of 60 parts of rubber-modified polystyrene (with an Izod impact strength of 8.7 kg. cm/cm) prepared by bulk polymerization of styrene containing 8% polybutadiene and 40 parts of polystyrene (Stylon 683, Asahi Dow). Each of the blends was kneaded in an extruder, and injection-molded into test pieces, which were tested for Izod impact strength.

As found in the test results shown in Table 10, below, the resin composition containing a random segmented copolymer according to the present invention [Example 10] has quite higher impact strength than the resin composition containing a copolymer with less Segment A [Comparative Example 13], thus making the composition of the present invention quite useful from a practical point of view.

TABLE 10

| Samples | Izod impact strength (notched) kg . cm/cm |
|---|---|
| Example 10 | 16.9 |
| Comparative Example 13 | 13.5 |

EXAMPLE 11

Following the same procedure of Example 4 except that 0.08 g of butyllithium was used, there was obtained a random segment copolymer of the (A-B)$_4$Si type [Example-11 sample]. This polymer had a bound styrene content of 35.1 wt. % and a block styrene content of 9.8 wt. %.

35 parts of the above-mentioned random segment copolymer was blended with 100 parts of commercially available polystyrene (Stylon 470, Asahi Dow), and the blend was pelletized by the same method as in Example 4. The test pieces obtained by compression molding of the blended composition has an Izod impact strength of 46.2 kg.cm/cm (notched).

EXAMPLE 12

To the same 1-liter autoclave as used in Example 1, there was charged 166.7 g of dry pre-purified cyclohexane. The temperature inside the autoclave was maintained at 90° C., and a solution of butyllithium in hexane was added in an amount of 0.04 g in terms of butyllithium. A mixture of 11.4 g of butadiene, 2.9 g of styrene, and 33.4 g of cyclohexane (for use in polymerization of Segment B) was pumped into the autoclave at a rate of 3 ml/min. When charging was finished, a mixture of 1.9 g of butadiene, 17.1 g of styrene, and 44.3 g of cyclohexane (for use in polymerization of Segment A) was charged at a rate of 3 ml/min. When charging was finished, the reaction mixture was left to stand for about 5 min. A mixture of 44.8 g of butadiene, 2.9 g of styrene, and 111.3 g of cyclohexane (for use in polymerization of Segment B) was then charged at a rate of 3 ml/min. When charging was finished, a mixture of 1.9 g of butadiene, 17.1 g of styrene, and 44.3 g of cyclohexane (for use in polymerization of Segment A) was charged at a rate of 3 ml/min. When charging was finished, the reaction mixture was left to stand for about 15 min. The polymerization temperature was maintained at 90° C. all through this process. A copolymer solution thus obtained was treated as aforesaid to obtain a random segmented copolymer of the B-A-B-A type [Example-12 sample]. This polymer had a bound styrene content of 39.7 wt. % and a block styrene content of 16.4 wt. %.

40 parts of the above-mentioned random segment copolymer was then blended with 100 parts of a mixture consisting of 40 wt. % of commercially available poly(2,6-dimethyl-1,4-phenylene)ether (PPO), and 60 wt. % of commercially available rubber-modified polystyrene (Stylon 470, Asahi Dow). The blend was kneaded at 250° C. by means of a twin-screw extruder and was pelletized by a cutter. The test pieces obtained by compression molding of the blended composition had an Izod impact strength of 52.7 kg.cm/cm (notched).

What is claimed:

1. An alkenyl aromatic resin composition having an excellent impact strength, which comprises (I) 100 parts by weight of a rubber-modified alkenyl aromatic resin containing from 2 to 35 wt. % of conjugated diolefin components, or a resinous mixture containing at least a component of the resin thereof; and (II) 1 to 50 parts by weight of a random segmented copolymer containing at least a Segment A, which is a random copolymer segment of a conjugated diolefin and a vinyl-substituted aromatic compound with a weight ratio ranging from 30:70 to 5:95, respectively, and at least a Segment B, which is either a conjugated diolefin polymer segment or a random copolymer segment of a conjugated diolefin and a vinyl-substituted aromatic compound with a weight ratio ranging from 100:0 to 75:25, respectively, the random segmented copolymer being characterized by containing;

(a) at least 10 wt. % of Segment A based on the total random segmented copolymer, (b) at least 20 wt. % of Segment B based on the total random segmented copolymer, and (c) the sum of Segment A and Segment B being at least 60 wt. % based on the total random segmented copolymer.

2. A composition according to claim 1, wherein the random segmented copolymer has a content of bound vinyl-substituted aromatic compound in the range of from 30 to 65 wt. %.

3. A composition according to claim 1, wherein the rubber-modified alkenyl aromatic resin containing from 2 to 35 wt. % of conjugated diolefin components, is at least one selected from the group consisting of rubber-modified polystyrene, acrylonitrile-butadienestyrene copolymer, methylmethacrylate-butadienestyrene copolymer, and conjugated diolefin-styrene block copolymer resin.

4. A composition according to claim 1, wherein the resinous mixture is a mixture of a rubber-modified alkenyl aromatic resin containing 2 to 35 wt. % conjugated diolefin components with at least one thermoplastic resin selected from the group consisting of a polyphenylene ether resin, polystyrene, polyethylene, polypropylene, polyvinyl chloride, nylon, polyacetal, polycarbonate, polysulfone, and polyester.

5. A composition according to claim 1, wherein the conjugated diolefin is at least one selected from the group consisting of 1,3-butadiene, isoprene, 1,3-pentadiene, 2,3-dimethyl-1,3-butadiene, 3-butyl-1,3-octadiene, 1-phenyl-1,3-butadiene, 1,3-hexadiene, 1,3-octadiene, and 4-ethyl-1,3-hexadiene.

6. A composition according to claim 1, wherein the vinyl-substituted aromatic compound is at least one selected from the group consisting of styrene, o-methylstyrene, p-methylstyrene, m-methylstyrene, α-methylstyrene, p-ethylstyrene, 2,4-dimethylstyrene, vinylnaphthalene, and vinylanthracene.

7. A composition, further comprising 1–50 parts by weight of an additive, based on 100 parts by weight of the alkenyl aromatic resin composition according to claim 1.

8. A composition according to claim 7, wherein the additive is at least one selected from the group consisting of flame retardants; glass fiber; glass beads; organic fibers; pigments; dyestuffs; inorganic reinforcing agents; organic reinforcing agents; metal powder; woodmeal; other extenders.

* * * * *